June 25, 1929.
H. S. CASSEL
1,718,216
BRAKING ARRANGEMENT
Filed Oct. 3, 1924
2 Sheets-Sheet 1
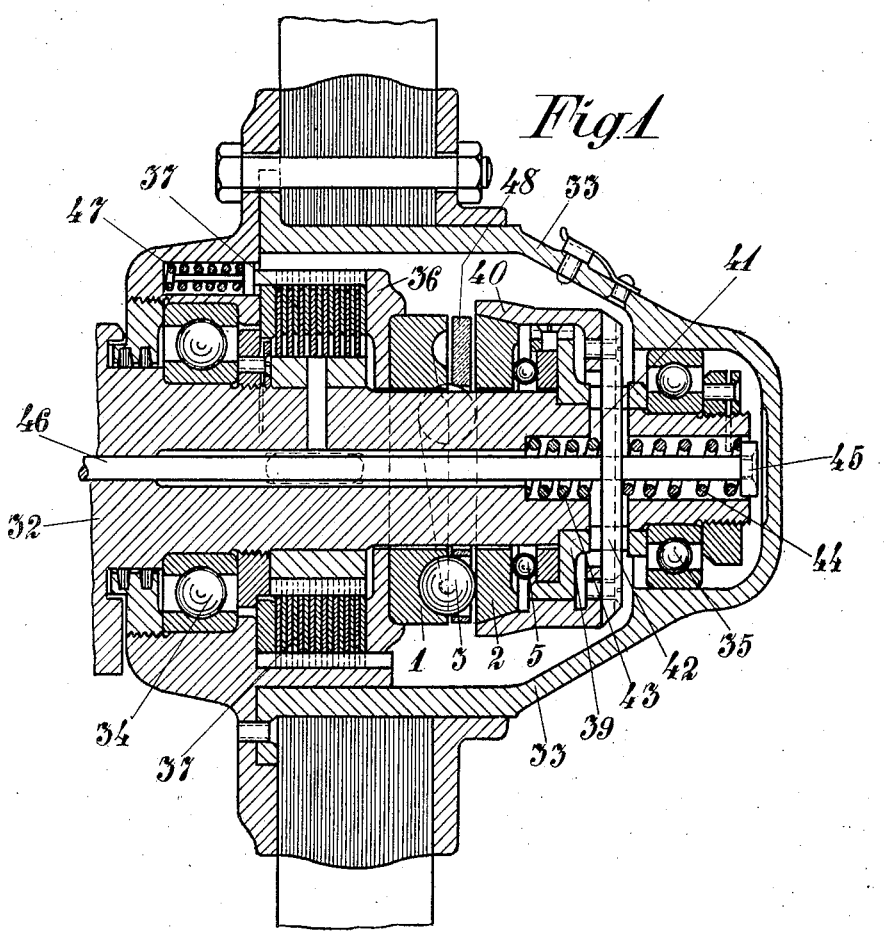
INVENTOR
Hjalmar S. Cassel
BY
HIS ATTORNEY

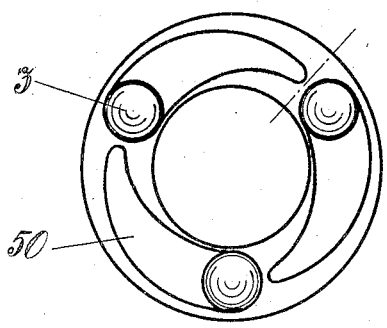
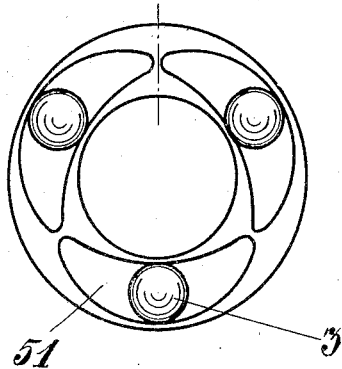
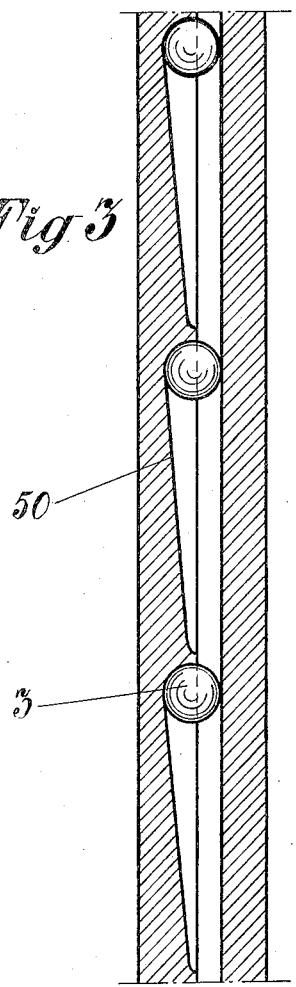
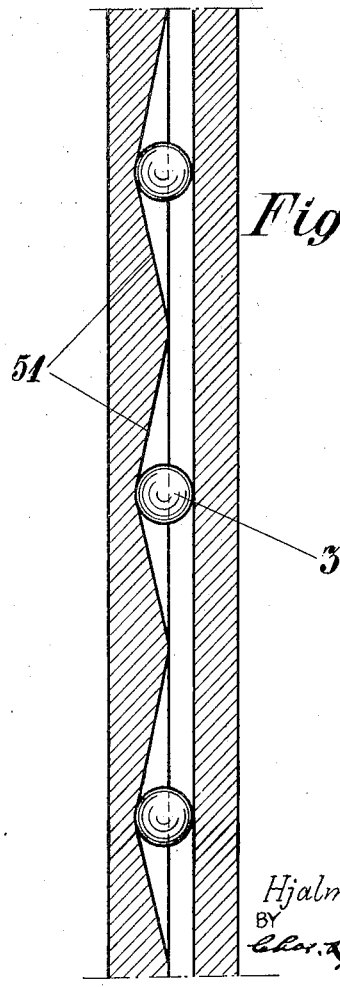

Patented June 25, 1929.

1,718,216

UNITED STATES PATENT OFFICE.

HJALMAR S. CASSEL, OF LUND, SWEDEN, ASSIGNOR TO AKTIEBOLAGET SVENSKA KULLAGERFABRIKEN, A CORPORATION OF SWEDEN.

BRAKING ARRANGEMENT.

Application filed October 3, 1924. Serial No. 741,355.

This invention relates to braking arrangement and is in the general nature of an improvement upon the braking arrangement set forth in an application filed by me April 12, 1923, Ser. No. 631,683.

The object of my present invention is to provide a device in which the main braking force is obtained from the rotating member, resulting in a powerful braking effect by means of a small amount of supplied power.

While in accordance to my above stated application the ball bearing rings are each provided with a channel or channels which reduce in depth and accordingly in width I provide according to the present invention only one ring with such a channel while the other ring is provided with an annular uniform plane surface.

This arrangement offers the advantage above the older construction in that it becomes unnecessary to mount the rings and their ball cage in a certain relation to each other, as the device will always be ready to act in the manner as described below.

The inclined planes in one ring may increase in depth and width in one direction only, in which case the device is suitable as a braking device in one direction only, for instance for brakes mounted in the hub of a front wheel of a motor car, or the channel may have wave form, thus making the device operating in both directions.

In the accompanying drawings Fig. 1 is a sectional view of a device embodying my invention in one form. Fig. 2 is a face view illustrating one form of inclined planes for the balls, the balls being shown at the deepest portion of each of the inclined planes; Fig. 3 is a transverse sectional view of the ring, taken on the centre line of the channels shown in Fig. 2 and spread out in a plan and including the section of the plain ring; Fig. 4 is a face view of a ring illustrating another form of inclined plane, such ring being adaptable for use for braking in either direction; and Fig. 5 is a transverse sectional view of the ring shown in Fig. 4 and taken in a similar manner as Fig. 3.

In referring to Fig. 1 the non-rotating axle is indicated by the reference numeral 32, this axle being for example of the type as used for front wheels of a motor car. On this axle the hub 33 of a wheel is journaled by means of ball bearings 34 and 35. The rings 1 and 2 forming the subject matter of my invention are loosely and rotatably mounted on the axle 32. The ring 1 is shown bedded into an aperture of the disklike member 36 abutting against one side of the lamellated brake 37 the lamellæ of which are alternatively fixed by means of keys or the like to the hub 33 and the axle 32. Between this ball bearing ring 1, which may be termed a laterally movable ring, and the disk like member 36 no ball thrust bearing is required, inasmuch as both parts follow the rotation of the hub and any rotation in relation of one to the other does not occur. On the outside of the other ring 2, which may be termed by way of distinction the second ring, a ball thrust bearing 5 is mounted, the outer ball race of which being securely fixed to the axle 32 by the medium of a flanged disk 39 supporting the same. This flanged disk 39 carries axially displaceably thereon a cup like member 40 provided internally with a wedge periphery adapted to act as braking means upon the ring 2. The member 40 carries a transverse bar 42 extending through an elongated transverse slot 41 in the axle 32, said transverse bar 42 being acted upon by coiled springs 43 and 44 one on each side, and arranged in a central bore through the axle 32. One of the springs 43 is shown abutting with its inner end against a shoulder in the central bore and the other spring 44 is shown abutting against a shoulder 45 on the outer end of control rod 46 which is mounted for reciprocation in the central bore of the axle 32, passing through a hole arranged for this purpose in the transverse bar 42. This control rod 46 may be operated by some suitable means such as a pedal, a lever or the like and when displaced inwards (to the left in the drawing) against the action of the springs 43 and 44 the latter spring 44 acts upon the transverse bar 42 thereby displacing the cup-like member 40 toward the ring 2 so that this latter by the frictional engagement with the internal wedge periphery of the member 40 will be caused to relatively retard in its rotation. Thereby the balls 3 between the rings 1 and 2 will receive a rolling motion and as the channels or inclined plane 50 or 51 in one ring is sloping the two rings are forced apart whereby the ring 1 by the medium of the disk like member 36 is pressed against the lamellated brake 37 which accordingly will be set in action.

When the control rod 46 is released and allowed to move outwards under the influence of spring 43, the braking means 40 will be moved away from the ring 2 and the main brake 37 will be loosened by the springs 47 specially arranged for this purpose.

The inclined planes in the ring 2 are of such grade that the balls 3 will roll back to their initial position and the rings 1 and 2 will return to their original position through the medium of the pressure normally exerted upon them laterally from the outside. In order to keep the balls 3 in correct position a loose ball cage 48 may be arranged.

When the hub 33 is in rotation it moves with it the lamellæ which are associated with the hub, the alternate lamellæ being fast with the axle 32 according to well-known practice. When the brake is not set and the parts are running free, this member 36, brake members 1, 3, 48 and 2, rotate with the hub. The braking member 40 which is in the nature of a friction clutch stands stationary with the axle 32. Upon the application of pressure to the control rod 46 and its movement toward the left-hand side in Fig. 1, the inner flanged face of the cup 40 applies friction pressure to the outer conical face of the second ring 2 and causes this ring to either slow down its rotation or to stop rotating entirely. Immediately there is set up a difference in relative rotation between the rings 1 and 2, whereupon each of the balls 3 rides up its inclined plane 50 or 51 and causes the ring 1 to move laterally toward the left-hand side, moving with it, of course, the disk-like member 36 which compresses together the lamellæ of the brake 37 and creates the braking friction between these lamellæ which is imparted by these members to the axle 30 and the hub 33.

It is to be understood that the balls 3 may of course be replaced by rollers. In Figs. 2 and 3 three inclined planes 50 and accordingly three balls 3 are shown and these planes in this case are shown sloping in one direction only, whilst in Figs. 4 and 5 the planes 51 are shown sloping in two directions the difference between the two arrangements being that the device according to Figs. 2, 3 is suitable for use in cases where a braking in one direction of rotation is sufficient and the device according to Figs. 4, 5 is suitable for all cases where a braking is required in both directions of rotation. The number of channels and accordingly the number of rolling members may be varied.

I make no claim in this present application to any of the subject matter herein disclosed which is claimed in my prior pending application hereinbefore referred to, to wit, my application filed April 12, 1923, Ser. No. 631,683.

Having thus fully described my invention, what I claim as new and desire to secure by Letter Patent is:—

In combination in a brake operating device, a laterally movable ring controlling the operation of the brake, a second ring adjacent to said laterally movable ring and free to rotate therewith, inclined planes being formed on one of said rings, the other being formed with a plane face opposed to the said inclined planes, a brake for changing the speed of said second ring in relation to said laterally movable ring, one bearing ball between each of said inclined planes and the plane face, a loose ball-cage holding the balls at constant distances apart, said balls automatically rolling back to the lowest points of said inclined planes when the braking ceases and carrying said ball-cage to its original position.

In testimony whereof, I have signed my name to this specification.

HJALMAR S. CASSEL.